June 19, 1956   H. J. KEEN ET AL   2,751,483
CONSTANT TEMPERATURE OVEN
Filed June 28, 1954
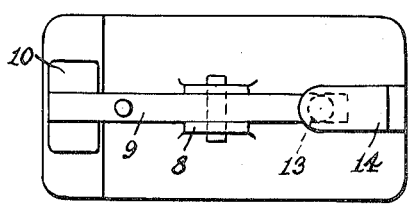
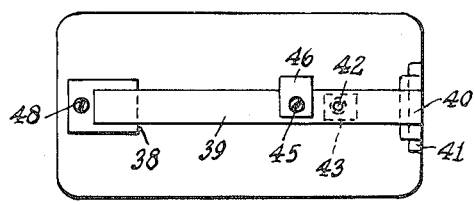
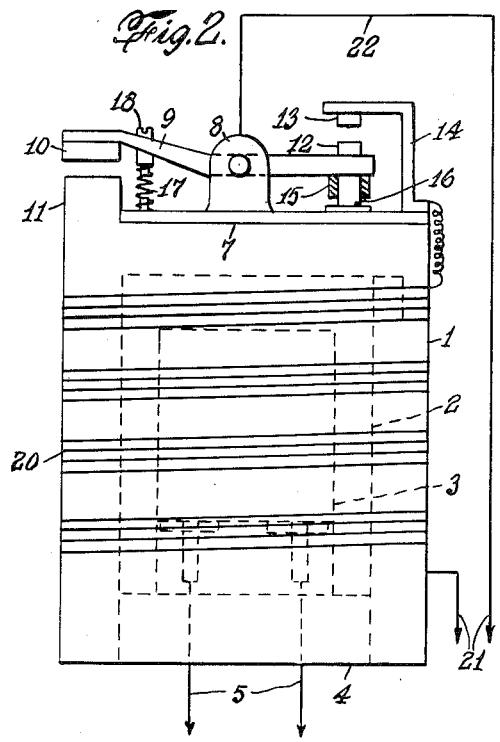
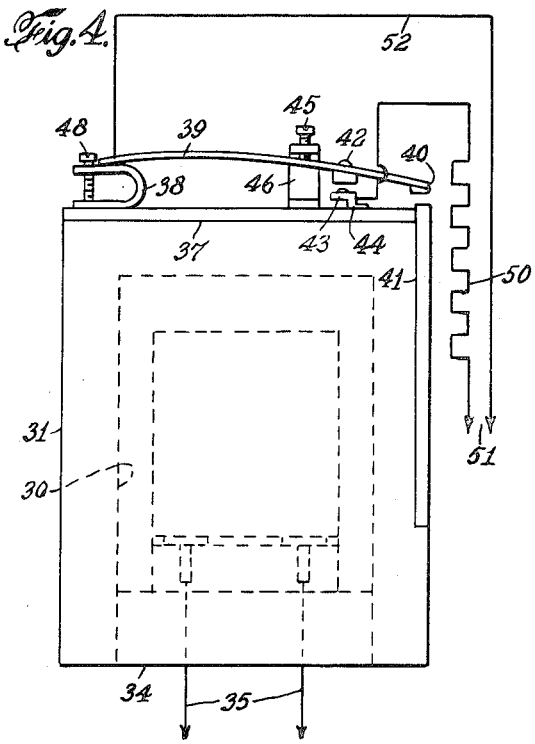
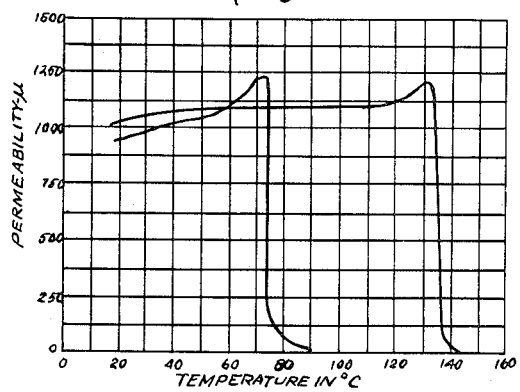

United States Patent Office 2,751,483
Patented June 19, 1956

2,751,483

CONSTANT TEMPERATURE OVEN

Harry J. Keen, Middletown, and Robert J. Papaieck and Alfred J. Gilbert, Jr., Matawan, N. J., assignors to Lavoie Laboratories, Inc., Morganville, N. J., a corporation of New Jersey Application June 28, 1954, Serial No. 439,518

5 Claims. (Cl. 219—19)

The present invention relates to crystal ovens and to temperature responsive devices for maintaining the temperature of such ovens constant.

Many electrical circuits include crystals which need to be kept at a constant temperature for the proper operation of the circuit. For this purpose it is customary to enclose such crystals in a chamber or "oven" which is heated electrically and maintained at a constant temperature usually somewhat above the maximum ambient temperature for which the apparatus is designed. Heretofore the temperature of crystal ovens has customarily been controlled by a thermostat employing a bimetallic element or otherwise utilizing the different coefficients of thermal expansion of metals, such for example as brass and Invar, to open and close a heating control circuit. While refinements of such devices have been made, it is extremely difficult to obtain the accuracy and closeness of control that is needed to maintain the temperature within the narrow limits required. A further difficulty stems from the fact that the movement produced by metals having differential thermal coefficients of expansion is slow and of small magnitude so that it is necessary to employ devices for multiplying the movement and in some cases to produce a snap action. Such devices introduce further possibilities of error and instability. It is consequently difficult to keep such control mechanism in proper adjustment to maintain the oven at the designed temperature.

It is an object of the present invention to overcome these difficulties and disadvantages and provide a temperature responsive device that is more accurate and more stable and one that will operate in a narrower range than those heretofore utilized. A further feature of the invention is that the temperature responsive mechanism is in itself snap-acting so that rapid opening and closing of electric contacts are assured without the need of any supplementary devices.

Other objects and advantages of the invention will be apparent from the following description and claims in conjunction with the accompanying drawings in which:

Fig. 1 is a top view of a crystal oven embodying a temperature-responsive device in accordance with the invention.

Fig. 2 is a side elevation of the crystal oven shown in Fig. 1, a heating winding and circuit connections being shown schematically.

Figs. 3 and 4 are a top view and side elevation respectively of another embodiment of the invention.

Fig. 5 is a permeability-temperature curve of magnetic material used in the temperature-responsive device as will be described more fully below.

The crystal oven illustrated in Figs. 1 and 2 comprises an enclosure or chamber 1 having a cavity 2 adapted to receive a crystal cartridge 3 having a base 4 and connecting leads 5. The cover 4 of the crystal cartridge fits snugly into the open end of the cavity 2 so as to close the cavity and is suitably held in place, for example by a friction fit or a spring catch or detent.

An insulating plate 7 formed of phenolic resin or other suitable insulating material is mounted on the closed end of the chamber 1, i. e. the upper end as viewed in Fig. 2 and is suitably held in place, for example by clips, rivets or adhesive. Spaced bearings 8 project upwardly from the insulating plate 7 and pivotally support a lever 9. One end of the lever 9 carries a magnet 10 disposed above an upwardly projecting portion 11 of the chamber 1. The magnet 10 is of any suitable type, for example an electro-magnet, but is preferably a small permanent magnet, as shown. The opposite end portion of the lever 9 carries an electrical contact 12 adapted to engage a fixed contact 13 carried by a bracket 14 mounted on the insulating base 7. The lever 9 is adapted to swing about the pivot provided by the bearings 8 between a "closed" position in which contact 12 engages contact 13 and the magnet 10 is substantially in engagement with the upwardly projecting portion 11 of the chamber 1 and an "open" position as shown in Fig. 2. Movement of the lever 9 in a clockwise direction is limited by an adjustable stop comprising a fiber collar 15 which is internally threaded and screwed on to a threaded stub 16 mounted on the insulating plate 7. A spring 17, the force of which is adjustable by means of a screw 18, resiliently urges the lever 9 toward "open" position.

A heating winding 20 is wrapped around the chamber 1 so as to be in heat-conducting relationship to the chamber and is suitably held in place, for example by a heat-conducting and heat-resistant adhesive. One end of the winding 20 is connected to one side of a suitable power source indicated at 21 while the other end is connected through the bracket 14 to the contact 13, the cooperating contact 12 being connected through the lever 9 and a lead 22 to the opposite side of the power source. The contacts 12 and 13 thus constitute a control switch for the heating winding 20.

The chamber 1, or at least the upwardly projecting portion 11 of the chamber, is formed of magnetic material having a Curie temperature corresponding to the temperature at which the oven is to be maintained. As the Curie temperatures of magnetic materials are known, or can readily be ascertained, the material used is selected according to the temperature at which it is desired to maintain the crystal. Preferably, the material has a high permeability below the Curie temperature and the permeability drops off sharply substantially to zero when the Curie temperature is reached. Among the materials that are suitable are those known as ferrites, which are non-metallic, ferromagnetic substances compounded from various metal oxides. Ferrites are manufactured by a process which includes the intimate mixing of proper oxides, for example ferromanganese zinc oxides, either pressing or extruding the mixture into a suitable shape and then sintering. After sintering, the material is very hard but it can be cut with a diamond saw or ground. The Curie temperature is predetermined by selection of the metal oxides used in the composition and can be varied considerably by using different oxides. The permeability-temperature curves of two suitable materials are shown by way of example in Fig. 5. It will be seen that one of these materials has a Curie temperature of 75° C. while the Curie temperature of the other is 135° C. When the Curie temperature of the material is reached, the permeability drops off sharply as illustrated by the curves.

When the temperature of the chamber 1 is below the Curie temperature of the material forming the chamber, or at least the portion 11, the magnet 10 is attracted to the portion 11 of the chamber so as to swing the lever 9 to a "closed" position in which contact 12 engages contact 13. The heating circuit is thereby closed and the chamber 1 is accordingly heated by the winding 20. When the temperature of the chamber is raised to the Curie temperature of the material, the material loses its permeability and the magnet 10 is no longer attracted by the projection 11. The spring 17 thereupon swings the lever 9 in a clockwise direction to the position shown in Fig. 2. This opens the contacts 12, 13 and hence the heating circuit. If the temperature of the chamber then falls slightly, the material regains its permeability, attracting the magnet 10 and closing the contacts 12, 13. The oven is thereby maintained at a temperature corresponding to the Curie temperature of the material of which it is formed.

When the material of the chamber 1 loses its permeability—i. e. when the Curie temperature is reached—the pull of the material on the magnet 10 decreases so that it is less than the force of the spring 17. As the magnet 10 thereupon starts to move away from the projection 11 of the chamber 1, the pull on the magnet rapidly becomes still less because of the increasing distance between the magnet and the projection 11. Conversely, when the permeability of the material forming the projection 11 is restored—upon a slight decrease in temperature—the pull of the magnet becomes greater than the force of the spring 17, causing the magnet to move toward the projection 11. As the distance between the magnet and the projection 11 decreases, the magnetic force increases, thereby causing a rapid movement of the magnet. The device in accordance with the invention is thus naturally "snap-acting" without the need of any auxiliary device. Moreover, it will be seen that adequate movement of the contact 12 is obtained, so that no motion-multiplying device is needed. As the Curie temperature of a material remains constant throughout its life—after a brief aging period—the critical operating temperature of the device is permanently constant. When the magnet 10 is a permanent magnet, it is formed of a material having a Curie temperature materially above that used for the chamber 1, so that the magnet 10 is not demagnetized at the selected operating temperature.

In Figs. 3 and 4, there is shown another embodiment of the invention comprising a chamber or enclosure 31 having a cavity 32 receiving a crystal cartridge 33 having a base 34 and connecting leads 35. On the closed end of the chamber 31—the upper end as shown in Fig. 4—there is an insulating plate 37 which is adhesively or otherwise secured to the end of the chamber. A resilient U-shaped clip 38 mounted on the insulating plate 37 supports a lighter resilient arm 39 one end of which is brazed, welded, riveted, or otherwise suitably secured to the upper leg of the U-shaped clip 38. At its free end, the arm 39 carries a small magnet 40 disposed above the upper end of an inset 41 in the chamber 31. In this embodiment, the chamber 31 is formed of heat-conducting, non-magnetic material, for example brass, while the inset 41 inserted in a suitable recess in the wall of the chamber 31 is formed of magnetic material having a preselected Curie temperature, as described above. The inset 41 is in heat-conducting relationship with the chamber 31 and is suitably secured to the chamber, for example by adhesive or by being held in an undercut recess.

The resilient arm 39 also carries an electrical contact 42 adapted to engage a fixed contact 43 carried by a bracket 44 mounted on the insulating plate 37. Movement of the resilient arm 39 in a direction to open the contacts is adjustably limited by a screw 45 in a bracket 46. The spring tension of the arm 39 is adjustable by means of a screw 48 adapted to spread the opposite legs of the U-shaped clip 38 a greater or lesser distance apart and thereby vary the angle at which the fixed end of the arm 39 is held, it being understood that the clip 38 is stronger than the arm 39.

The chamber 31 is provided with an electric heater indicated schematically at 50. If the heater comprises a winding similar to the heating winding 20 shown in Fig. 2, it will be seen that this winding will hold the inset 41 in place and will be in heat-conducting relationship both with the inset 41 and the chamber 31. One end of the heating winding is connected to one side of a suitable power source 51 while the opposite end is connected to the contact 43. The cooperating contact 42 is connected through the arm 39 and a lead 52 with the opposite side of the power supply.

The operation of the embodiment shown in Figs. 3 and 4 is essentially the same as that of Figs. 1 and 2. When the temperature of the chamber 31 is below the Curie temperature of the inset 41, the magnet 40 is attracted by the inset, closing the contacts 42, 43 and thereby turning on the heater 50. When the temperature is above the Curie temperature of the material forming the inset 41, the magnet 40 is no longer attracted by the inset 41 and the contacts are opened by the resiliency of the arm 39.

It will be understood that the compatible features of the two embodiments shown by way of example in the drawings are mutually interchangeable with one another and that many other modifications may be made in the structure and arrangement of the device. Thus, while the switching means for the heater has been shown by open contacts, the amplitude of movement and the force obtainable by the temperature-responsive device in accordance with the invention are adequate to operate other types of switches such as closed or mercury switches as well as valves and other suitable control devices. While control of the heating winding has, for the sake of simplicity, been shown as either "on" or "off," it will be understood that the invention is equally applicable to a graduated or partial control so that in the "off" position of the switch device the current is reduced. It will further be understood that two or more control devices in accordance with the invention may be used in combination with one another. For example, each may control a suitable heating winding and have different critical temperatures so that one device will operate at one temperature and another at a different temperature. Many other applications and modifications will be apparent to those skilled in the art.

What we claim and desire to secure by Letters Patent is:

1. In a crystal oven, a chamber adapted to receive a crystal, at least a portion of said chamber being formed of a ferromagnetic material having a selected Curie temperature, an electric heater disposed in heating relationship to said chamber, a magnet movably mounted on said chamber in a position to be attracted to said ferromagnetic material and spaced from and not having contact with said heater, resilient means for moving said magnet away from said ferromagnetic material, and means for supplying current to said heater including an electric switch operated by movement of said magnet to supply current to said heater when said ferromagnetic material is below its Curie temperature and said magnet is attracted to said material and to reduce said current when said ferromagnetic material is above its Curie temperature and said magnet is moved away from said ferromagnetic material by said resilient means.

2. In a crystal oven, a chamber adapted to receive a crystal, at least a portion of said chamber being formed of a ferromagnetic material having a selected Curie temperature, an electric heater disposed in heating relationship to said chamber, an arm swingably mounted on said chamber, a magnet carried by said arm and movable toward and away from said ferromagnetic material, said magnet being removed from and not having contact with said heater, resilient means for moving said magnet away from said material and means for supplying current to said heater including an electric switch operated by said arm to supply current to said arm to supply current to said heater when said ferromagnetic material is below its Curie temperature and said magnet is hence attracted to said material and to reduce said current when said ferromagnetic material is above its Curie temperature and said magnet is moved away from said material by said resilient means.

3. In a crystal oven, a chamber adapted to receive a crystal, at least a portion of said chamber being formed of magnetic material having a selected Curie temperature, an electric heater winding around said chamber, an arm swingably mounted on said chamber, a magnet carried by said arm and movable toward and away from said ferromagnetic material said magnet being spaced from and not having contact with said heater, resilient means for moving and biasing said magnet away from said material and means for supplying current to said heater winding including an electric switch operated by said arm to supply current to said heater winding when said ferromagnetic material is below its Curie temperature and said magnet is hence attracted to said material and to cut off current when said ferromagnetic material is above its Curie temperature and said magnet is moved away from said material by said resilient means.

4. In a crystal oven, a chamber adapted to receive a crystal and formed predominantly of non-magnetic material, an inset of magnetic material in said chamber, an arm swingably mounted on said chamber, a magnet carried by said arm, said arm and magnet being positioned for the magnet to be attracted to said inset and thereby swing said arm in one direction, resilient means for swinging said arm in the opposite direction, an electric heater for said chamber including said inset said heater being spaced from and not having contact with said magnet, and means for supplying current to said heater comprising an insulated contact on said chamber and a cooperating contact on said arm, said contacts being closed to supply current to said heater when said magnet is attracted to said inset and being opened by said resilient means to cut off said current when the temperature of said inset exceeds the Curie temperature of said material whereby said material loses its magnetic properties and ceases to attract said magnet.

5. In a constant temperature oven, a chamber, at least a portion of which is formed of magnetic material having a selected Curie temperature corresponding to the desired temperature of the oven, a heater disposed in heating relationship to said chamber, a magnet movably mounted on said chamber in a position to be attracted by said magnetic material said heater and said magnet being spaced relative one another and not having contact with each other, resilient means for moving said magnet away from said magnetic material, the force exerted on said magnet by said magnetic material being normally greater than the force exerted by said resilient means, and an electric control circuit for said heater including a switch operated by the movement of said magnet to turn on said heater when said magnet is attracted by said magnetic material and to turn off said heater when the temperature of said material rises above its Curie temperature whereby said material ceases to attract the magnet and said magnet is thereupon moved away from said material by said resilient means.

References Cited in the file of this patent

UNITED STATES PATENTS

| | | |
|---|---|---|
| 1,874,909 | Conklin | Aug. 30, 1932 |
| 2,151,319 | Finch | Mar. 21, 1939 |
| 2,207,871 | Myers | July 16, 1940 |
| 2,269,162 | Newell | Jan. 6, 1942 |
| 2,437,488 | Ulanet | Mar. 9, 1948 |
| 2,470,134 | Bitner | May 17, 1949 |